United States Patent
Liu et al.

(10) Patent No.: US 11,009,857 B2
(45) Date of Patent: May 18, 2021

(54) APPLICATION METHOD OF THE THERMAL ERROR-TEMPERATURE LOOP IN THE SPINDLE OF A CNC MACHINE TOOL

(71) Applicant: Dalian University of Technology, Dalian (CN)

(72) Inventors: Kuo Liu, Dalian (CN); Haibo Liu, Dalian (CN); Te Li, Dalian (CN); Haining Liu, Dalian (CN); Yongqing Wang, Dalian (CN); Zhenyuan Jia, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 189 days.

(21) Appl. No.: 16/471,478

(22) PCT Filed: Aug. 30, 2018

(86) PCT No.: PCT/CN2018/103121
§ 371 (c)(1),
(2) Date: Jun. 19, 2019

(87) PCT Pub. No.: WO2020/006851
PCT Pub. Date: Jan. 9, 2020

(65) Prior Publication Data
US 2020/0272134 A1 Aug. 27, 2020

(30) Foreign Application Priority Data
Jul. 5, 2018 (CN) .......................... 201810731810.2

(51) Int. Cl.
*G05B 19/418* (2006.01)
(52) U.S. Cl.
CPC .............. *G05B 19/4184* (2013.01); *G05B 2219/49207* (2013.01)

(58) Field of Classification Search
CPC ...... G05B 19/4184; G05B 2219/49207; G05B 19/401; G05B 2219/49209; B23Q 11/0003; B23Q 17/00; B23Q 17/22
(Continued)

(56) References Cited

U.S. PATENT DOCUMENTS

| 5,795,112 A * | 8/1998 | Senda ................. G05B 19/404 408/13 |
| 2006/0218811 A1* | 10/2006 | Sato ................... G05B 19/404 33/702 |
| 2013/0116851 A1* | 5/2013 | Sasaki .................. G06F 1/206 700/299 |

FOREIGN PATENT DOCUMENTS

| CN | 101972947 A | 2/2011 |
| CN | 103926874 A | 7/2014 |

(Continued)

OTHER PUBLICATIONS

Li, Y. et al. A review on spindle thermal error compensation in machine tools, International Journal of Machine Tools and Manufacture, ScienceDirect, vol. 95, 2015, pp. 20-38, ISSN 0890-6955, [online], [retrieved on Feb. 16, 2021], Retrieved from the Internet (Year: 2015).*

(Continued)

*Primary Examiner* — Kenneth M Lo
*Assistant Examiner* — Mohammed Shafayet
(74) *Attorney, Agent, or Firm* — Muncy, Geissler, Olds & Lowe, P.C.

(57) ABSTRACT

An application method of the thermal error-temperature loop in the spindle of a CNC machine tool. This uses a bar and two displacement sensors to determine radial thermal errors of the spindle. Meanwhile two temperature sensors are used to determine the temperature of the upper and lower surfaces of the spindle box. Then, the thermal error-temperature loop is drawn with the temperature difference between two tem- (Continued)

perature sensors as the abscissa and the radial thermal error of the spindle as the ordinate. Finally, the loop is employed to analyze the mechanism of the radial thermal deformation of the spindle and the thermal error level is evaluated. Since the method is based on measured data, the results of the analysis are closer to the reality, compared to those from the numerical simulations.

1 Claim, 2 Drawing Sheets

(58) Field of Classification Search
USPC .......................................................... 700/175
See application file for complete search history.

(56) References Cited

FOREIGN PATENT DOCUMENTS

| | | | | | |
|---|---|---|---|---|---|
| CN | 105759719 | A | | 7/2016 | |
| CN | 106736848 | A | * | 5/2017 | ............. B23Q 15/18 |
| CN | 107942934 | A | | 4/2018 | |
| JP | H 11-221738 | A | | 8/1999 | |
| WO | WO-2011024838 | A1 | * | 3/2011 | ........... G05B 19/404 |

OTHER PUBLICATIONS

Yang, J. et al., Thermal error modeling and compensation for a high-speed motorized spindle, Int J Adv Manuf Technol, 77, 1005-1017, 2015, [online], [retrieved on Feb. 16, 2021], Retrieved from the Internet (Year: 2015).*

* cited by examiner

APPLICATION METHOD OF THE THERMAL ERROR-TEMPERATURE LOOP IN THE SPINDLE OF A CNC MACHINE TOOL

TECHNICAL FIELD

This invention belongs to the technical field of the thermal error testing of the CNC machine tools and specifically relates to an application method of the thermal error-temperature loop in the spindle of a CNC machine tool.

BACKGROUND

It was first found in Switzerland in 1933, through measuring and analyzing the coordinate-boring machine, that the thermal deformation is the main factor affecting the positioning accuracy of the CNC machine. Since then, many scholars have performed variety of researches on the thermal error mechanism and the machine accuracy.

In the article *Analysis on Thermal Dynamic Characteristics of CNC Machine Tool Spindle*, which was published in the 9th issue of *Journal of Tianjin University* in 2013, Jiang et al confirmed the existence and variation of the thermal dynamic characteristics by using the finite element method and experimental research. In the article *Thermal Characteristics Analysis and Experimental Study on High-Speed Spindle System*, which was published in the 11th issue of *Journal of Zhejiang University (Engineering Science)* in 2015, Ma et al performed the transient thermal-structural coupling analysis, based on the three-dimensional finite element model of the spindle and the contact heat conduction of the joint surface. Thereby the simulation accuracy was significantly improved. In the article *Analysis on Heat Transfer Mechanism and Optimization of Temperature Measuring Points of High-speed Electric Spindle*, which was published in the first issue of *Coal Mine Machinery* in 2015, Wei et al analyzed the heat transfer mechanism of the spindle from motor, bearing and environment view of point. In the article *Thermal Characteristics Analysis of the Spindle System of Heavy Duty Horizontal Lath*, which was published in the 6th issue of *Journal of University of Electronic Science and Technology of China* in 2016, Huang et al employed the finite element thermo-solid coupling method and calculated the thermal deformation characteristics of the spindle after reaching to the thermal equilibrium. In the patent A MOTOR SPINDLE TEMPERATURE AND THERMAL DEFORMATION TEST DEVICE, whose application number is CN201510781183.X, Zheng et al proposed a device for testing the thermal deformation of the spindle. The device consists of the control unit, temperature detecting unit, cooling unit and a thermal error test unit. In the patent A METHOD FOR THERMAL DEFORMATION ANALYSIS OF A CNC MACHINE SPINDLE, whose application number is CN201510855597.2, Liu Bo installed an electric heating coil on the sidewall of the spindle sleeve, which shortened the analysis cycle of spindle's thermal deformation.

Through reviewing the literature in the field of thermal deformation and the accuracy of the CNC machine, deficiencies in the current research are found as follows:

(1) At present, most of analyses on the thermal deformation mechanism of the spindle are carried out by the finite element method. The numerical method is based on the simulation and has a certain gap with the actual process.

(2) At present, the thermal error of the spindle can be obtained from the thermal deformation and temperature data. However, there is no method for the in-depth analysis of the spindle's thermal deformation mechanism.

SUMMARY OF THE INVENTION

The object of the present invention is to overcome the deficiencies of the existing methods for the thermal error mechanism analysis of the spindle, and to provide the "thermal error-temperature" loop of the CNC machine tool spindle and its application method in the industry. The proposed method not only can analyze the thermal deformation mechanism, but also can evaluate and contrast the thermal error level.

The technical solution of the invention:

The application method of the "thermal error-temperature" loop in the spindle of a CNC machine tool is described. A bar and two displacement sensors are initially used to determine the radial thermal errors of the spindle, including the thermal drift error and thermal tilt error; Meanwhile, two temperature sensors are used to determine the temperature of the upper and lower surfaces of the spindle box; Then, based on the radial thermal drift error of the spindle and the temperature difference between the upper and lower surfaces of the spindle box, the "thermal error-temperature" loop is drawn; Finally, the mechanism of the radial thermal deformation of the spindle is analyzed based on the "thermal error-temperature" loop so that the level of the thermal error can be evaluated.

The proposed method has the following steps:

(1) One temperature sensor is arranged on each of the upper and lower surfaces of the spindle box. The temperature sensor near the surface of the spindle motor is $T_1$ and the other temperature sensor is $T_2$;

(2) A bar and two displacement sensors are utilized to determine the radial thermal drift error along the X- and Y-directions of the spindle; The direction with higher radial thermal drift error is selected. Then, the bar and two displacement sensors are arranged along the spindle axis to determine its thermal error. The displacement sensor near the nose of the spindle is $P_2$ and the other one is called $P_1$. The test direction of the displacement sensor is set as: the bar moves away from the displacement sensors along with the radial thermal drift error increasing;

(3) The test procedure for the thermal error and temperature: the spindle initially runs for M hours at a certain speed and then the spindle stops running and remains at rest for N hours. Therefore, the total test time is M+N hours. The data of two temperature sensors are recorded during the test for the radial thermal error of the spindle;

(4) Let two groups of temperature data measured by temperature sensors $T_1$ and $T_2$ be $t_1$ and $t_2$. Moreover, let two groups of displacement data measured by displacement sensors $P_1$ and $P_2$ be $e_1$ and $e_2$. The formula for calculating the temperature difference $\Delta T$ between $T_1$ and $T_2$ is as follow:

$$\Delta T(i)=[t_1(i)-t_1(1)]-[t_2(i)-t_2(1)], i=1,2,\ldots,n \quad (1)$$

the curve drawn with $\Delta T$ as the abscissa and $e_1$ as the ordinate is approximately a loop, which is called the thermal error-temperature loop;

(5) Based on the "thermal error-temperature" loop, the radial thermal deformation of the spindle is analyzed and the radial thermal error level of the spindle is evaluated. The evaluation method is as the following:

a) the bigger size of the "thermal error-temperature" loop is, the greater the radial thermal tilt and the thermal drift of the spindle are;

b) the flatter the "thermal error-temperature" loop in the lateral direction is, the lager the radial thermal drift of the spindle is, and the smaller the thermal tilt is;

c) the flatter the "thermal error-temperature" loop in the longitudinal direction is, the larger the radial thermal tilt of the spindle is, and the smaller the thermal drift is.

The beneficial effects of the invention are as follows: the mechanism of spindle's radial thermal deformation is investigated through the testing and analysis methods, which are provided by the proposed invention. Based on the deformation mechanism, the optimization design of the machine can be carried out, which can reduce the manufacturing and operational costs and improve the machine efficiency. Moreover, a mechanism-based thermal error compensation method can be developed based on the analyzed thermal deformation mechanism. This method has higher precision and more robustness in comparison with those from the existing data-based thermal error compensation methods.

Compared with the prior methods, the proposed invention has the advantages of providing a method for performing spindle's thermal deformation analysis based on data of temperature and thermal error, which can obtain thermal deformation mechanism and law as well as evaluate and contrast thermal drift and thermal tilt level. Since the method is based on the measured data, the results of the analysis are closer to the reality than that from the numerical simulation.

DRAWINGS

DETAILED DESCRIPTION

In order to make the objects, technical solutions and advantages of the proposed invention more clear, a specific embodiment of the invention with the reference to a certain type of the vertical machining center is described as below.

(1) The temperature sensors entitled by $T_1$ and $T_2$ are arranged on the upper and lower surfaces of the spindle box, respectively.

Figure 1:
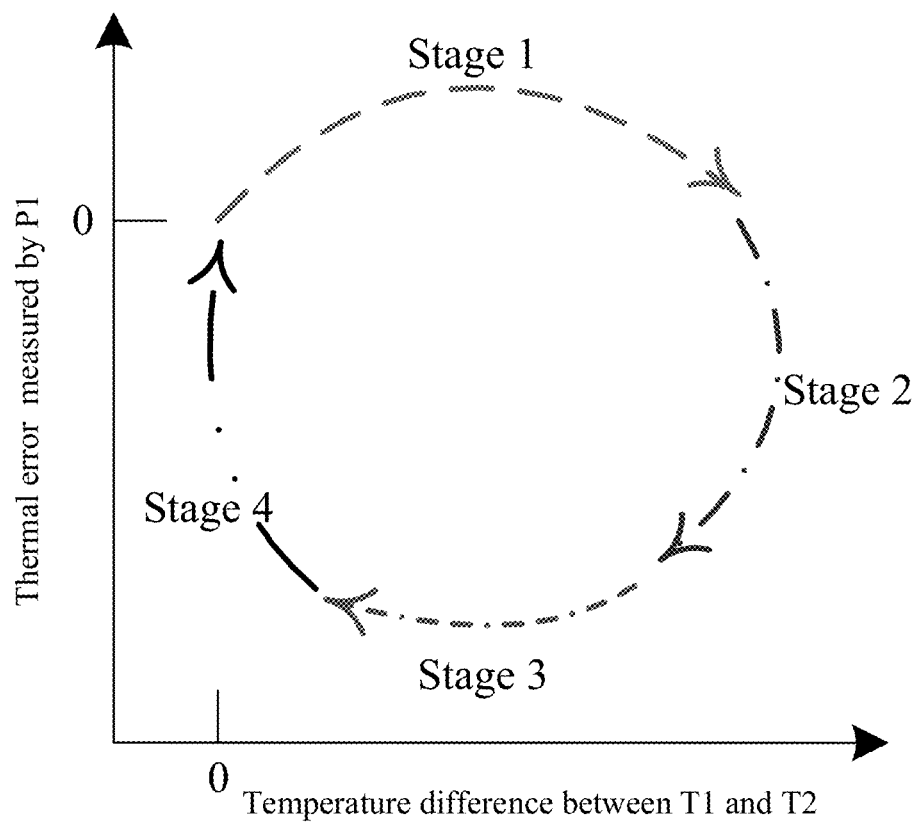
FIG. 1 is a schematic diagram of the "thermal error-temperature" loop.
Figure 2:
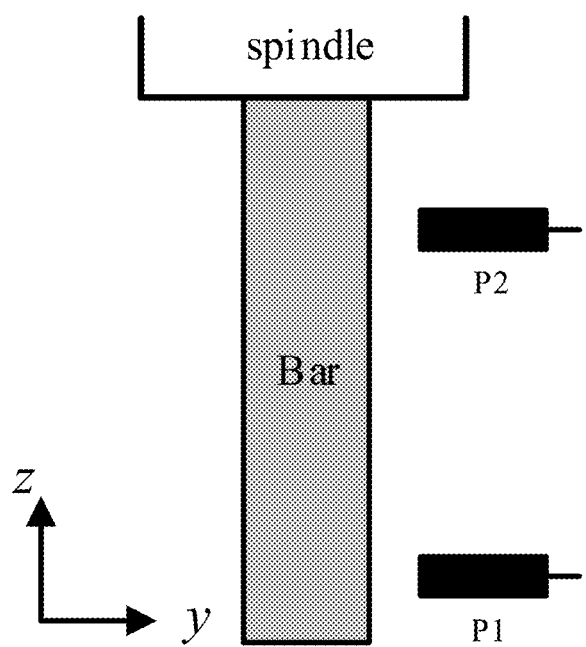
FIG. 2 shows a schematic diagram of the radial thermal error test of the spindle.

(2) A bar and two displacement sensors are utilized to determine the thermal drift error along the X- and Y-directions of the spindle. The spindle continuously rotates at 2000 rpm for 1 hour during the test. It is found that the thermal drift errors in the X- and Y-directions are 1.2 μm and 8.2 μm, respectively. Therefore, it is concluded that the radial error along the Y-direction is the governing error. Moreover, after shutting down the machine for 3 hours, the Lion spindle error analyzer is used to test the radial thermal drift and thermal tilt error along the Y-direction of the spindle. The upper and lower displacement sensors are $P_1$ and $P_2$ respectively. It is observed that when the bar is close to the displacement sensor, the test value is positive, while when the bar is far away from the displacement sensor, the test value is negative. FIG. 2 shows the configuration of sensors in the proposed scheme.

(3) In order to contrast the thermal error level of the spindle at different speeds, three tests are carried out at 1000 rpm, 2000 rpm and 4000 rpm respectively. The spindle continuously runs for 4 hours and then remains at rest for 3 hours. Moreover, record the data from the displacement sensor and the temperature sensor in 10 s cycle during the test.

Figure 3:
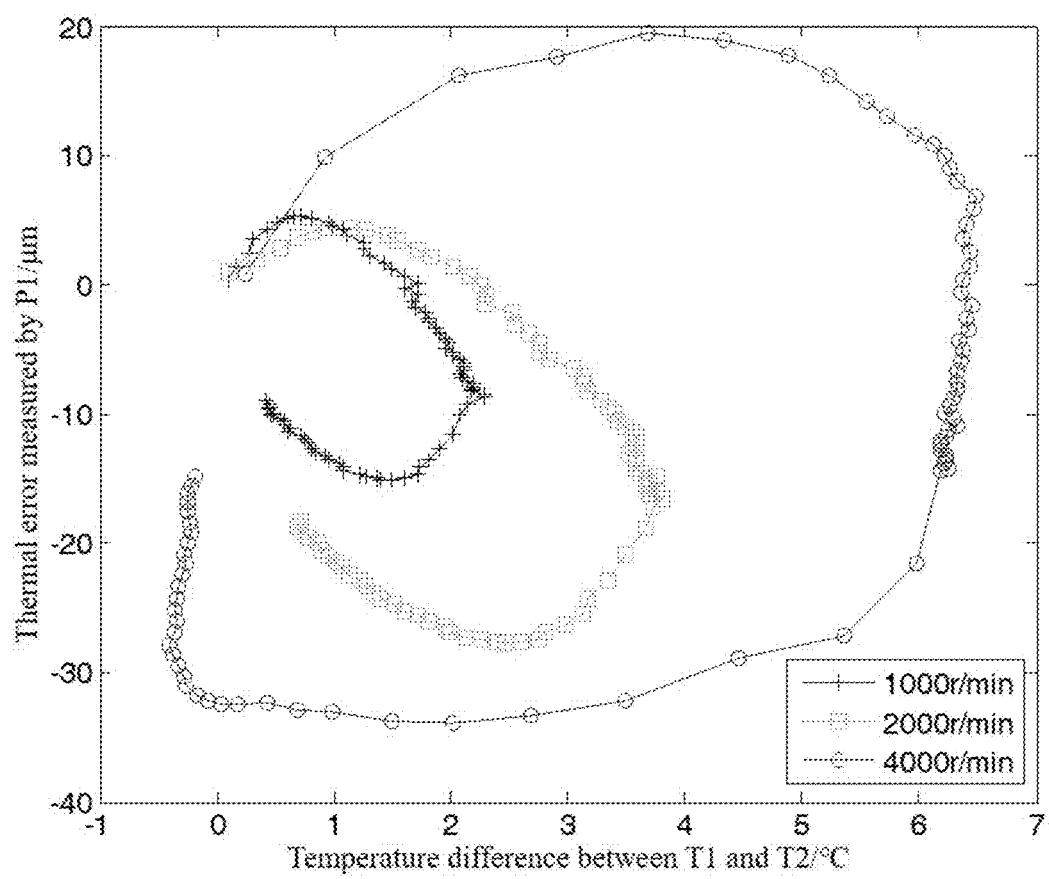
FIG. 3 illustrates the measured thermal error-temperature loop at different speeds.

(4) Let two groups of temperature data measured by temperature sensors $T_1$ and $T_2$ be $t_1$ and $t_2$. Let two groups of displacement data measured by displacement sensors $P_1$ and $P_2$ be $e_1$ and $e_2$. The temperature difference $\Delta T$ between $T_1$ and $T_2$ is calculated in accordance with formula (1). The curve drawn with $\Delta T$ as the abscissa and $e_1$ as the ordinate is the thermal error-temperature loop, as shown in FIG. 3.

(5) Based on the "thermal error-temperature" loop, the radial thermal deformation of the spindle in the Y-direction is divided into the following 4 stages:

a) Stage 1: The spindle starts to rotate and $T_1$ heats up rapidly due to heat sources, such as the spindle motor. On the other hand, $T_2$ is far from these heat sources and the temperature rise lags behind $T_1$, which results in an abrupt increment in the temperature difference between $T_1$ and $T_2$. Meanwhile, the radial thermal error of the spindle is mainly the thermal tilt, and the dip is rapidly increased. Therefore, the bar is close to the displacement sensor and the error value is positive;

b) Stage 2: As the spindle runs, the temperature difference between $T_1$ and $T_2$ gradually stabilizes, the thermal tilt of the spindle also stabilizes and the thermal drift increases gradually. Thereby, the bar gradually moves away from the displacement sensor so that the error value gradually becomes negative and changes in the negative direction;

c) Stage 3: The spindle stops rotating and cools down. Since the temperature value of $T_1$ is higher than that for $T_2$, its temperature drop is faster than that for $T_2$. Therefore, the temperature difference between $T_1$ and $T_2$ rapidly decreases so that the radial thermal tilt of the spindle rapidly decreases. Meanwhile, the bar is still far away from the displacement sensor and the error value still changes in the negative direction;

d) Stage 4: After a period of cooling, the temperatures of $T_1$ and $T_2$ decrease towards the ambient temperature so that the radial thermal tilt and thermal drift of the spindle decrease and the bar gradually approaches the displacement sensor. Therefore, the error value changes in the positive direction.

(6) According to the "thermal error-temperature" loop, the following conclusions are drawn:

a) The higher the spindle speed is, the larger the thermal error-temperature loop is. This indicates that the higher the spindle speed is, the greater the thermal tilt and thermal drift are.

b) The "thermal error-temperature" loop is not closed at the end because the cooling time is not enough so that the spindle does not return to the initial thermal equilibrium.

The invention claimed is:

1. An application method of thermal error-temperature loop in a spindle of a CNC machine tool, using, initially, a bar and two displacement sensors to determine radial thermal errors of the spindle, wherein the radial thermal errors include radial thermal drift error, and radial thermal tilt error;

using two temperature sensors; wherein, using one of the temperature sensors to determine temperature of an upper surface of spindle box, and using the other temperature sensor to determine temperature of a lower surface of the spindle box;

drawing the thermal error-temperature loop based on the radial thermal drift error of the spindle and temperature difference between the upper surface and the lower surface of the spindle box;

analyzing mechanism of radial thermal deformation of the spindle based on the thermal error-temperature loop in order to evaluate a level of the radial thermal errors;

wherein steps of evaluating the level of the radial thermal errors are as follows:

(1) arranging one of the temperature sensors on each of the upper surface of the spindle box and arranging the other temperature sensor on the lower surface of the spindle box, respectively; wherein the temperature sensor arranged on the upper surface of the spindle box is $T_1$ and the other temperature sensor arranged on the lower surface of the spindle box is $T_2$;

(2) determining the radial thermal drift error along X- and Y-directions of the spindle by utilizing the bar and the two displacement sensors; selecting a direction corresponding to a high value of the radial thermal drift error; determining the radial thermal drift error of the spindle using the bar and the two displacement sensors arranged along a spindle axis; wherein the displacement sensor near a nose of the spindle is $P_2$ and the other displacement sensor is $P_1$; setting a test direction of the displacement sensors: the bar moves away from the displacement sensors as the radial thermal drift error increases;

(3) test procedures for the radial thermal errors and temperature are as follows: letting the spindle initially run for M hours at a certain speed, and then stopping the run and letting the spindle remain at rest for N hours; determining a total test time as M+N hours; recoding data of the two temperature sensors during the test for the radial thermal errors of the spindle;

(4) letting two groups of temperature data measured by the temperature sensors $T_1$ and $T_2$ be $t_1$ and $t_2$, respectively; letting two groups of displacement data measured by the displacement sensors $P_1$ and $P_2$ be $e_1$ and $e_2$, respectively; calculating the temperature difference $\Delta T$ between $T_1$ and $T_2$ using the formula:

$$\Delta T(1)=[t_1(1)]-[t_2(1)-t_2(1)], i=1,2,\ldots,n \qquad (1)$$

drawing a curve that is the thermal error-temperature loop with $\Delta T$ as abscissa and $e_1$ as ordinate;

(5) analyzing the radial thermal deformation of the spindle and evaluating the level of the radial thermal errors of the spindle based on the thermal error-temperature loop; evaluating the level of the radial thermal errors of the spindle is as follows:

a) the larger the size of the thermal error-temperature loop is, the larger a radial thermal tilt and a radial thermal drift of the spindle are;

b) the flatter the thermal error-temperature loop in a lateral direction is, the larger the radial thermal drift of the spindle is, and the smaller the radial thermal tilt of the spindle is;

c) the flatter the thermal error-temperature loop in a longitudinal direction is, the larger the radial thermal tilt of the spindle is, and the smaller the radial thermal drift of the spindle is.

* * * * *